(12) United States Patent
Frankel et al.

(10) Patent No.: US 9,396,182 B2
(45) Date of Patent: *Jul. 19, 2016

(54) MULTI-LINGUAL CONFERENCE BRIDGE WITH CUES AND METHOD OF USE

(71) Applicant: ZipDX LLC, Monte Sereno, CA (US)

(72) Inventors: David Frankel, Los Gabos, CA (US); Barry Slaughter Olsen, Pebble Beach, CA (US)

(73) Assignee: ZipDX LLC, Monte Sereno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,666

(22) Filed: Apr. 2, 2015

(65) Prior Publication Data

US 2015/0213004 A1    Jul. 30, 2015

Related U.S. Application Data

(63) Continuation of application No. 13/691,100, filed on Nov. 30, 2012, now Pat. No. 9,031,827.

(51) Int. Cl.
*G06F 17/20* (2006.01)
*G06F 17/28* (2006.01)
*H04M 3/56* (2006.01)
*G10L 15/00* (2013.01)

(52) U.S. Cl.
CPC .............. *G06F 17/28* (2013.01); *G10L 15/005* (2013.01); *H04M 3/568* (2013.01); *H04M 2201/41* (2013.01); *H04M 2242/12* (2013.01); *H04M 2250/58* (2013.01)

(58) Field of Classification Search
CPC ... G06F 17/289; G06F 17/28; G06F 17/2854; G06F 9/4448; G06F 9/4552; G06F 17/2827; G06F 17/275; G06F 17/30669; G06F 3/16; G10L 15/1822; G10L 15/22; G10L 15/26; G10L 17/00; G10L 19/008; H04M 3/42; H04M 7/1245; H04M 7/1255; H04M 3/56; H04M 3/567; H04M 3/42221; H04M 3/564; H04M 3/568; H04M 3/569; H04M 2203/2061
USPC .............. 704/1–10, 251, 255, 257, 277, 200, 704/225, 272, 270
See application file for complete search history.

(56) References Cited

U.S. PATENT DOCUMENTS

| | | |
|---|---|---|
| 5,233,663 A | 8/1993 | Wood |
| 5,392,343 A | 2/1995 | Davitt et al. |

(Continued)

FOREIGN PATENT DOCUMENTS

EP    1 696 338    8/2006

OTHER PUBLICATIONS

Zissman, Automatic Language Identification of Telephone Speech, The Lincoln Laboratory Journal, vol. 8, No. 2, 1995, pp. 115-144.

(Continued)

*Primary Examiner* — Huyen Vo
(74) *Attorney, Agent, or Firm* — Vedder Price P.C.

(57) ABSTRACT

The present invention relates to a new method and system for use of a multi-protocol conference bridge, and more specifically a new multi-language conference bridge system and method of use where different cues, such as an attenuated voice of an original non-interpreted speaker, is used to improve the flow of information over the system.

6 Claims, 5 Drawing Sheets

(56) References Cited

U.S. PATENT DOCUMENTS

| | | | |
|---|---|---|---|
| 5,426,706 | A | 6/1995 | Wood |
| 6,690,932 | B1 | 2/2004 | Barnier et al. |
| 6,816,468 | B1 * | 11/2004 | Cruickshank ............ 370/260 |
| 7,006,604 | B2 | 2/2006 | Engelke |
| 7,006,616 | B1 | 2/2006 | Christofferson et al. |
| 7,245,710 | B1 | 7/2007 | Hughes |
| 7,773,738 | B2 | 8/2010 | Sterns |
| 7,792,276 | B2 | 9/2010 | Moore, Jr. et al. |
| 7,894,596 | B2 | 2/2011 | Moore, Jr. et al. |
| 7,970,598 | B1 | 6/2011 | Flanagan et al. |
| 8,175,244 | B1 * | 5/2012 | Frankel ............ 379/202.01 |
| 2006/0165225 | A1 | 7/2006 | Sahashi |
| 2007/0050306 | A1 | 3/2007 | McQueen |
| 2008/0292081 | A1 | 11/2008 | Brannon, Jr. et al. |
| 2008/0300852 | A1 | 12/2008 | Johnson et al. |
| 2009/0006076 | A1 | 1/2009 | Jindal |
| 2009/0089042 | A1 | 4/2009 | Wald et al. |
| 2009/0187400 | A1 | 7/2009 | Liu et al. |
| 2009/0274299 | A1 | 11/2009 | Caskey et al. |
| 2010/0066803 | A1 | 3/2010 | Robotka et al. |
| 2010/0135478 | A1 * | 6/2010 | Wald et al. ............ 379/202.01 |
| 2010/0150331 | A1 | 6/2010 | Gitelis et al. |
| 2010/0283829 | A1 | 11/2010 | De Beer et al. |
| 2011/0123015 | A1 | 5/2011 | Erhart et al. |

OTHER PUBLICATIONS

Gile, Article: Conference Interpreting, Brown, Keith (ed). 2006. Encyclopedia of Language and Linguisitcs, 2nd Ed. Oxford: Elsevier. vol. 3, pp. 9-23.

Paulike et al., Training Speech Translation From Audio Recordings of Interpreter-Mediated Communication, Computer Speech and Language (2011), doi: 10.1016/j.csl.2011.04.001, 20 pages.

* cited by examiner

MULTI-LINGUAL CONFERENCE BRIDGE WITH CUES AND METHOD OF USE

RELATED APPLICATIONS

This application is a Continuation Application of U.S. patent application Ser. No. 13/691,100, filed Nov. 30, 2012, entitled "MULTI-LINGUAL CONFERENCE BRIDGE WITH CUES AND METHOD OF USE" the contents of which is herein incorporated by reference in its entirety.

FIELD OF THE INVENTION

The present invention relates to a new method and system for use of a multi-lingual conference bridge, and more specifically a new multi-language conference bridge system and method of use where different cues and time stamps are used to further improve the easy flow of information over the bridge.

BACKGROUND

For decades, certain institutions, such as the United Nations, or large international corporations with offices around the world have conducted business in multiple languages. When physical meetings at the UN are convened, delegates in an auditorium in view of other delegates speak in their native languages. Interpreters are present and interpret what is said into the languages of the other delegates.

As a delegate speaks, the interpreter speaks in another language, the interpretation of what was said by the first delegate. To make the meeting as dynamic, interactive and productive as possible, the interpretation is often ideally done "simultaneously." This means that specially trained individuals listen to a delegate speak in one language, and interpret as rapidly as possible over the flow of words in what is called simultaneous interpretation. The delay of experienced interpreters can be reduced to several seconds or even less, depending on the languages involved.

Delegates in such a meeting are equipped with microphones and headphones to hear interpretations. The interpreters can be isolated in soundproof booths and are also equipped with microphones and headsets. A venue is specially wired and controls are provided to delegates, interpreters and moderators that allow for selection of audio inputs and outputs and control of audio mixing electronics. These semi-manual systems are extremely complex and costly.

In contrast to meeting physically at an auditorium, increasingly, organizations (including companies but also governments, non-profits, various regulatory, rule-making and standards bodies) convene their "meetings" using conference call technology as a way to avoid the time and expense of travel. Delegates or employees can participate from their home locations over a telephone or internet connection.

In the market, there is a desire to promote and conduct multi-lingual meetings via conference call, either replacing or extending the "in-person" meeting with a "virtual" meeting that includes participants connected from remote locations. A traditional conference call allows all participants to enter into a common bridge and hear each other as in a "party line" telephone call. If participants on the bridge speak different languages and cannot understand a common language, communication is quickly made impossible under this "party line" model.

In existing simplified models, in a conference call where participants speak different languages, the use of "consecutive" interpretation is often contemplated. In this mode of operation, an interpreter is included as an additional participant in the conference on the bridge and an agreement is reached to allow the interpreter time to interpret. When, for example, a delegate speaks in Spanish, she pauses after one or two sentences, and the interpreter repeats what she said in English. The delegate then resumes speaking briefly, and the process iterates for the duration of the entire conversation. When a delegate speaks in English, the interpreter waits for the delegate to pause, and then repeats what was said in Spanish. Everybody hears all of the Spanish and English utterances. This mode of interpretation is used, for example, when a sports figure is a guest on a television show and only a handful of questions will be presented to the athlete.

This approach is very slow and tedious, and makes the dialogue much less dynamic. While operating this system in two languages is a significant challenge, it becomes completely unwieldy when multiple languages are involved.

A further complication is that, unlike the in-person meeting at the United Nations, where the participants and interpreters can be positioned so they can see each other, over-the-phone meetings rely almost exclusively on audio cues. Participants need to somehow be able to glean the tone and demeanor of the speaker and to interrupt one another. They must avoid overrunning the interpreter or cutting each other off. This can be virtually impossible.

What is needed is a conference call capability that allows for simultaneous interpretation in two or more languages, without burdening delegates or interpreters with additional language constraints. Participants need to have a sense of context, so that they can yield when someone else wants to talk. The management of the conference must be left primarily to automated systems, so that the participants can focus on the topic of discussion and the interpreter(s) can devote their full concentration to their language duties.

Mr. David P. Frankel, the originator of the current invention, is an expert in the field of audio conferencing. In 2006, Frankel invented a new multi-fidelity conferencing bridge that allows participants to benefit from improved clarity and accuracy of conferencing bridges by developing a way to use Voice-over-Internet Protocol technology (VoIP) or public switched telephone network (PSTN) where both narrow band and wideband technology can peacefully coexist. Users who dial into the bridge with a wideband enabled tool are not forced down into the lower fidelity narrow band. Ultimately, this technology was patented as U.S. Pat. No. 7,986,644 ("Frankel I"). The content of Frankel I is hereby incorporated fully by reference as part of this application.

The next year, in 2007, Frankel improved conferencing bridges by inventing a new identity-based conferencing system where a bridge is capable of recognition of the identity of the individual users, for example to recognize a phone source identification number associated with the user. Through automatic recognition, the burden on the user of the conferencing system is alleviated as the user is able to access the system with less authentication information. This technology was patented as U.S. Pat. No. 7,343,908 ("Frankel II"). The content of Frankel II is hereby incorporated fully by reference.

Figure 1:
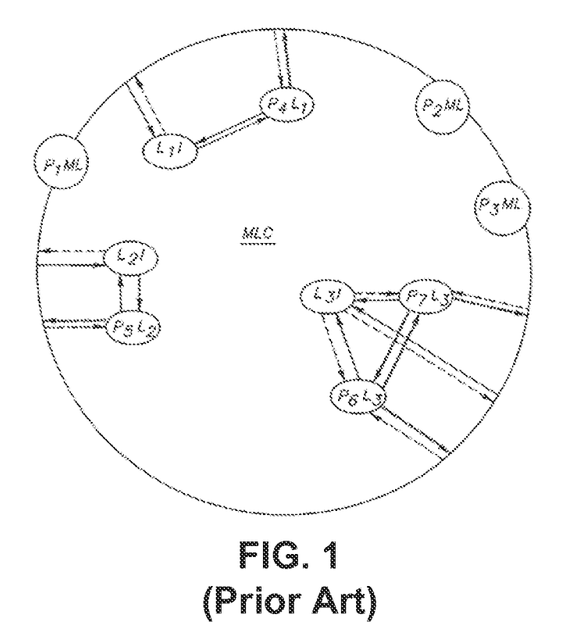
FIG. 1 is the fourth figure of U.S. Pat. No. 8,041,018 from the prior art.

The same year, in 2007, a different invention described in U.S. Pat. No. 8,041,018 ("Wald") was filed. Wald describes a conference bridge shown as FIG. 1 taken from the prior art where a main language circle is used as described above where each of the participants (P1 to P7) is connected to the main language circle. As part of this system, all of the interpreters (L1 to L3) must interpret between the main language and one other non-main language.

Wald is extremely limited in that it is rooted in the use of and connection to a main language of all participants where all other subsequent languages connect. This invention is not applicable to complex systems. For example, the United Nations operates with six official languages, and the European Community has twenty-four; Wald simply cannot be used by these users. In these institutions, not all of the meetings take place in all of the official languages but, to be practical, any system deployed in such a multi-lingual environment must be more versatile in that it must be able to accommodate numerous active languages and must provide for various styles of interpretation.

In some cases, UN interpreters work in only one direction; in other cases they work bi-directionally (i.e., they interpret back and forth between two languages). Relay interpretation in these institutions is also part of the standard operating procedure. The requirement that one language be designated as "primary" or "main" or "base" or be used by all of the interpreters is not acceptable. Wald would not be appropriate as there is no willingness to designate certain participants as "second tier" just because they do not speak the "primary language" of the meeting; in fact, it is critical in diplomatic conversations that the different languages all be treated equally. The Wald system requires that the interpreters (L1 to L3) in FIG. 1 all speak a common "main" language. The system fails unless L1, L2 and L3 speak the same language. Further, relay interpretation will not necessarily go through just a single language; there might be relay of Arabic to French to English, but also Chinese to English to Spanish. What is needed is a system of interpretation that can be used by any group or institution that is structured to allow for a wide diversity of use without the need for a 'main' language.

Partly to overcome some of the problems and limitations of Wald, in 2011, Frankel invented a new technology for conferencing bridges that allowed for the management of interpretation for users calling into the bridge and speaking different languages. The system as described used a floor control and acted as large dispatcher of the flow of speech between the different users and interpreters connected to the bridge. This technology was patented as U.S. Pat. No. 8,175,244 ("Frankel III").

Figure 2:
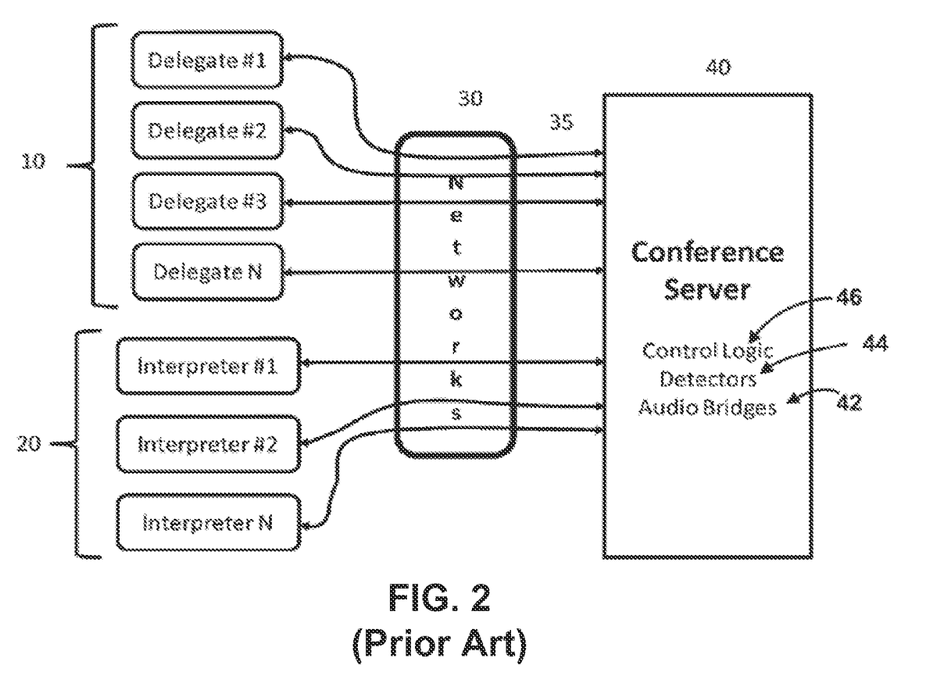
FIG. 2 is the first figure of U.S. Pat. No. 8,175,244 from the prior art.
Figure 3:
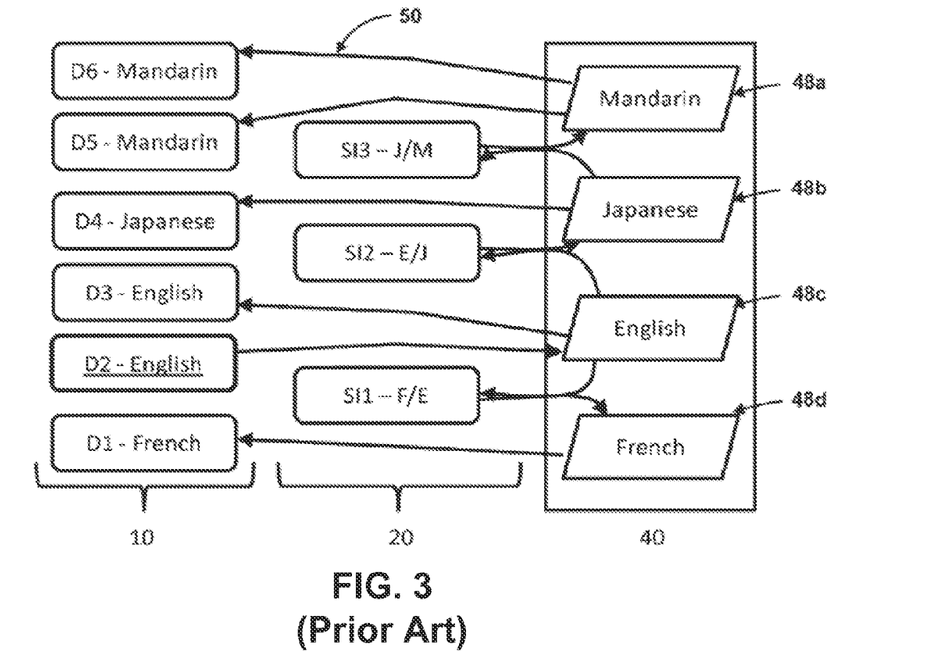
FIG. 3 is the second figure of U.S. Pat. No. 8,175,244 from the prior art.
Figure 4:
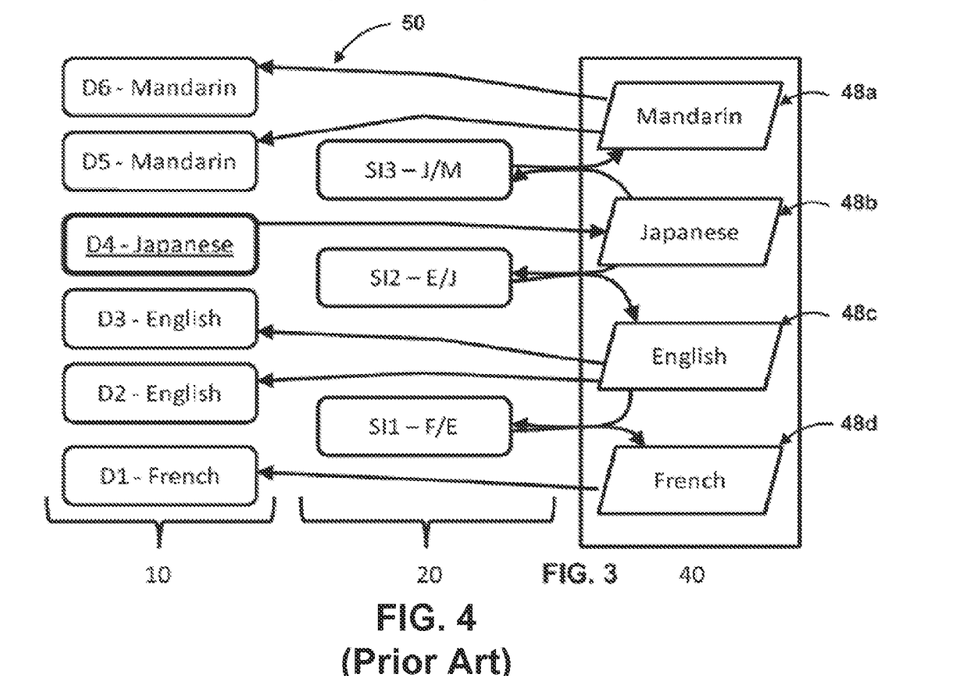
FIG. 4 is the third figure of U.S. Pat. No. 8,175,244 from the prior art.

The system as shown at FIG. 2, taken from the prior art, namely, from Frankel III, is fully incorporated herein by reference. Frankel describes how a series (1, 2, 3 . . . N) of users also called delegates 10 are connected via a network 30 to a conference server 40 where the different signals are processed. A plurality of interpreters (1, 2, 3 . . . N) 20 are also connected through a network 30 to the same server 40 where data is also processed. FIGS. 3 and 4 taken from Frankel III, show the flow of audio and/or video exchange when delegate 2 (D2) speaks as shown at FIG. 2, and when delegate 4 (D4) speaks as shown at FIG. 3. In these figures, four different bridges 48a, b, c, d are shown each where the conversation evolves in a different language (Mandarin 48a, Japanese 48b, English 48c and French 48d). In this model, there is no "main" bridge or "main" language as described in Wald.

FIGS. 3 and 4 of Frankel III use arrow heads to show how the data, voice and potentially image, are transmitted by the server 40. The Frankel III system shown at FIGS. 2, 3 and 4 allows for consecutive or simultaneous interpretation. This flexible and modular system allows for multiple users, delegates and interpreters, to connect to a server 40 in a wide range of configurations as needed by a client. To help understand the technology, the Microsoft® Corporation could desire to connect in a single conference call the four main design teams of its international units, these are located in Houston (English), Tokyo (Japanese), Taipei (Mandarin) and Montreal (French). The limited technology of Wald forces the organizers to define English as a "main" language and then require the help of three very specific interpreters, a Japanese/English, a Mandarin/English and a French/English interpreter.

Frankel III is much more flexible, as described at FIGS. 2, 3 and 4. First, there is no requirement for any of the four languages to be defined as "main." Four different bridges would be set up in the system and each would be linked using three different interpreters. Because the system is enabled once all four bridges are linked by any combination of interpreters, the choice of interpreters given to the system owner and operator is made simpler. As shown at FIG. 4, a first set of acceptable interpreters includes: (a) Japanese/Mandarin, (b) English/Japanese and (c) French/English. In fact, other sets of interpreters could also be used, such as: (a) Mandarin/French, (b) English/Japanese and (c) French/English; or even (a) Mandarin/English, (b) Japanese/English and (c) either English/French or Mandarin/Japanese. This is only one of the numerous advantages of Frankel III over the prior art.

While Frankel III is described at FIGS. 2, 3 and 4 and incorporated as part of the disclosure of this invention, it can be further improved. In the example shown at FIG. 4, the words of the Japanese delegate D4 are first interpreted by SI2 into English and then in turn the words are interpreted by SI1 in French. Even with simultaneous interpretation, the delay of the first interpretation is added to the delay of the second interpretation, resulting in a time lag. In a conversational setting as shown at FIG. 4, the delegates listening into the Mandarin and English bridges 48b, 48c will hear a feed delayed by 2-3 seconds while the delegates listening into the French bridge 48d will be delayed by 4-6 seconds. The lag between two different bridges renders active participation difficult. What is needed is a system and method designed to improve Frankel III capable of maintaining the numerous advantages of the system while allowing the participants to improve their overall experience.

SUMMARY

The present invention relates to a new method and system for use of a multi-protocol conference bridge, and more specifically a new multi-language conference bridge system and method of use where different cues, such as an attenuated voice of an original non-interpreted speaker is used to improve the flow of information over the system.

BRIEF DESCRIPTION OF THE DRAWINGS

Certain embodiments are shown in the drawings. However, it is understood that the present disclosure is not limited to the arrangements and instrumentality shown in the attached drawings.

DETAILED DESCRIPTION

For purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one skilled in the art to which this disclosure relates.

Portions of Frankel III already fully incorporated by reference are reproduced herein to help with the overall comprehension of this new invention and how it may be implemented in one of many different multi-lingual conference bridges. For example, what is shown is how the current invention can be implemented on a bridge as described in Frankel III and shown at FIGS. 2, 3 and 4. As part of this description, two concepts are described. First, the user of a system that speaks and understands at least one language and has a need to communicate, understand and exchange with other users of the system who may speak or understand a different language; these "users" are also described as "delegates," "speakers," or "callers" but other terms of equal meaning could be used. One of ordinary skill in the art of multi-lingual conference bridges will understand that, while several terms are used, what is contemplated and described is the concept of a person or even a device such as a machine needing active interpretation of a conference or multi-participant communication. Further, the term "interpreter" is used as an individual capable of listening into a conversation spoken in a first language and capable of producing a semi-simultaneous new spoken string of words in a second language. While one word is used, others like "live translator," "simultaneous translator," "multi-lingual individual" or other expressions can be used. What is also contemplated is that the different interpreters instead of being humans may be partly or fully automated systems capable of interpretation. Also what is contemplated under the term "language" is a protocol of communication, or information exchange, between two parties or users of the multi-lingual conference bridge. Currently, the inventor contemplates as the best mode of operation of the technology the application to audio interpretation and audio cues. While a language is generally recognized as a spoken means of communication between two different groups, the following invention could be extrapolated with time to much broader concepts when different needs arise and the technology can be extrapolated.

Computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks.

The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 2 illustrates an exemplary language-aware conferencing system (LACS) 8. As part of this system, delegates 10 and interpreters 20 are each equipped with a telecommunications device (shown at FIG. 5). As an example, the telecommunications device can be a conventional telephone, a computer with audio input/output capability, a smart phone, or some purpose-built device. As a further example, the telecommunications device can be equipped with a display. In certain aspects, at least one delegate 10 and/or interpreter 20 is equipped with both a telephone for audio exchange as well as a computer with a display and control capability.

The telecommunications devices of the delegates 10 and the interpreters 20 are in signal communication with a conference server 40 via connections 35. In certain aspects, the connections 35 are defined through one or more networks 30. As an example, the network(s) 30 can be the conventional public telephone network, the Internet, a mobile telephone network, a private network, or some combination of networks now known or later developed.

In certain aspects, the conference server 40 includes the functional elements of conventional conferencing systems, including audio bridges 42 that mix the audio for selected groups of participants, detectors 44 that sense inputs (such as keypad digits), and control logic 46 that determines how the audio bridges mix the various inputs and outputs. It is understood that the conference server 40 can include any number of components and sub-components for executing the methods disclosed herein. As an example, the conference server 40 can be implemented as software running on a conventional hardware platform (computer server) or a purpose-built hardware or a combination thereof.

FIG. 3 illustrates six of the delegates 10, identified individually as D1 through D6, and three of the interpreters 20, identified individually as SI1 through SI3, connected to conference server 40. As shown, two of the delegates D2, D3 speak English as a native language, two of the delegates D5, D6 speak Mandarin, one of the delegates D1 speaks French, and one of the delegates D4 speaks Japanese. One of the interpreters speaks French and English SI1, one of the interpreters SI2 speaks English and Japanese, and one of the interpreters SI3 speaks Japanese and Mandarin. Accordingly, the conference server 40 as shown, is configured with four bridges 48a, 48b, 48c, 48d, one for each language. While the technology allows for the conference server 40 to be configured for any number of languages and bridges, and where multiple serial interpretations can occur, the inventor discloses that under the best mode of operation, it is preferable to limit the number of serial interpretations to minimize the degradion of the quality of the interpretation.

As shown in FIG. 3, the delegate D2 "has the floor" (or is acknowledged as the speaker) and is shown with an underline, and a plurality of audio paths 50 are configured accordingly. As shown, the arrows of the audio paths 50 indicate a directional flow of the audio data/signal. With the exception of the delegate D2, all of the delegates 10 are in a listen-only mode, connected to their respective bridges 48. Audio from the delegate D2 is fed to the English bridge 48c. The interpreters SI1, SI2 are both listening to the English bridge 48c, wherein the interpreter SI1 is speaking into the French bridge 48d, and the interpreter SI2 is speaking into the Japanese bridge 48b. The interpreter SI3 is listening to the Japanese bridge 48b and speaking into the Mandarin bridge 48a.

FIG. 4 shows the same set of delegates 10 and interpreters 20 as FIG. 3. As shown, the delegate D4 now has the floor, and the audio paths 50 through the bridges 48 have been reconfigured accordingly. The delegate D2 is shown in a listen-only mode; the delegate D4 is shown speaking into the Japanese bridge 48b; and the interpreter SI2 is shown listening to the Japanese bridge 48b and speaking into the English bridge 48c. It is understood that the audio paths 50 and bridges 48 can be configured for any number of delegates 10 and interpreters 20 speaking any number of languages.

The present methods and systems can be operational with numerous other general purpose or special purpose computing system environments or configurations. Examples of well-known computing systems, environments and/or configurations that can be suitable for use with the systems and methods include, but are not limited to, personal computers, server computers, laptop devices and multiprocessor systems. Additional examples include set top boxes, programmable consumer electronics, network PCs, minicomputers, mainframe computers, distributed computing environments that comprise any of the above systems or devices, and the like. The systems and methods can be implemented in a public or private network and delivered as a cloud service.

A problem unique to multi-language bridge systems is the subsequent need for multiple interpretation of the same speech. For example, using the diagram shown at FIG. 3, three bilingual interpreters SI1, SI2, and SI3 are placed between the four bridges 48a, 48b, 48c and 48d. If the floor is given to what is shown as delegate 6 (D6) who speaks in Mandarin into bridge 48a, before the French speaking-delegate hears the conversation from the French bridge 48d, three interpretations will occur serially. While one way to increase the speed of the flow of communication between the different delegates, users or other parties using the system is to use simultaneous interpretation where the different interpreters are competent enough to initiate interpretation as the initial speaker is still talking, what is shown in this invention is the use of additional tools and methods to further increase the flow and speed of the system.

In addition to quality of information flowing in and out of a bridge, and the clarity of the information flowing in and out, one of the most important aspects is the dynamic flow of the information as participants talk and interpreters interpret. By dynamic flow we mean the capacity of the different users/Delegates D1 to D6 to receive the information, understand the information, process the information and be able to respond or act based on the information received. Conversations and conferences are generally improved as they become more fluid and the dynamic flow is increased. Participants in a more dynamic flow environment will feel more engaged and interested if they are able to quickly understand the information and respond without undue delays.

In an effort to better understand dynamic flow of conversation over a bridge and the different time delays and other time increments associated with overall bridging technology, time delays will be written, for example, using the Greek letter delta ($\Delta$) to illustrate a short increment and the letter T for time ($\Delta T$). While this terminology is used herein, one of ordinary skill in the art will recognize that any type of terminology and numerology could be used.

Figure 5:
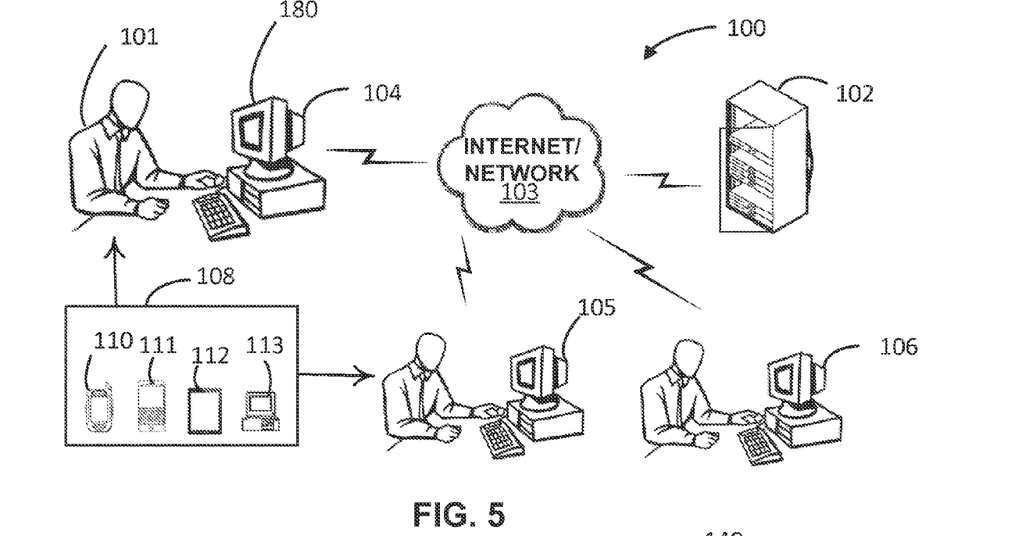
FIG. 5 is a diagrammatic representation of a system on which can be implemented a multi-lingual conference bridge with cues.

When understanding a flow of conversation between multiple people, there are multiple time delays $\Delta T$ that are created at different points in the overall conference over a bridge. For example, FIG. 5 shows a system 100 where a user 101 uses either a computer 104 or other device 108 such as a phone 110, a web enabled phone 111, a pad 112, or any other type of computer device 113 to log into a server 102 where the bridge exists. The connection will be done, for example, over a network 103 such as the Internet or any wireless network. A second user of the bridge 105 will also be connected and using a device 108 and, as shown here, either other users or interpreters 106 will also be connected to the bridge on the server 102.

Inherent to the use of any technology is a series of technological delays that can be understood as a sum of delays each associated with the responsiveness of the system, the power of the server, the quality of the connection, the quantity of equipment used, etc. In addition to delays that can be improved by improving the different technology used, there are software delays $\Delta T^{soft}$ associated with the management by software on the server of the different bridges. Because of rapid technical advances in computer sciences, these software delays can be reduced. Finally, conversational delays $\Delta T^{conv}$ also exist and are the major share of the total delay felt. For participants of any given conference call over a bridge, the total delay felt $\Delta T^T$ will be a sum of these other delays, namely:

$$\Delta T^T = \Delta T^{tech} + \Delta T^{soft} + \Delta T^{conv}$$

In cases where technological delays and software delays are very small, the overall total delay will be greatly improved as conversational delays are reduced. The current invention relates in part to the improvement of the enjoyment and usefulness of different types of conference bridges and other visual and oral systems as a result of the reduction of the total delay $\Delta T^T$ by a new dynamic of operation of the conversational flow and the interpretation flow that results in a new way to reduce the conversational delay $\Delta T^{conv}$.

As shown at FIG. 3, the system includes four different bridges 48a, 48b, 48c and 48d with three interpreters SI1, SI2 and SI3 interpreting between the different bridges. In this scenario, for the French delegate D1 to understand the Mandarin delegate D6, three subsequent interpreters even when simultaneous interpretation is used must hear a conversation and interpret into a second bridge.

The telecommunications devices of the delegates 10 and interpreters 20 communicate with a language-aware conference server (LACS) 40 via connections 35 through one or more networks 30. The network could be the conventional public telephone network, or it could be the Internet, or a mobile telephone network, or a private network, or some combination.

It is important to note that the invention does not normally require special technology at the location of each delegate and interpreter; they can use the same technology that they use for conventional telephone and computer applications. However, the devices and connections of the interpreters must be capable of full-duplex audio transmission without interference between transmit and receive directions; if the available technology does not support this over a single connection, it can be accomplished with two independent connections for an interpreter, and appropriate interface equipment at the interpreter's location. It is a contemplated best mode that that the delegates have two-way connections but the requirement for lack of interference is less stringent.

The conference server 40 comprises the functional elements of conventional conferencing systems, including audio bridges that mix the audio for selected groups of participants, detectors that sense inputs (such as keypad digits and audio activity), and control logic that determines how the audio bridges mix the various inputs and outputs. The conference server can be implemented as software running on a conventional hardware platform (computer server), or it could be purpose-built.

The current inventor has discovered that the human brain can be given several key types of information and cues associated with the original speech, an interpreted speech, or any other factor that can be made to travel in parallel of any consecutive and/or simultaneous interpretation to broadcast to a listener information about the conversation. For example, interpreters may hesitate or struggle with the conveyance of intonations or inflections in a voice. This problem can be heightened if several serial interpreters must interpret the same stream of data from one bridge to the next. A listener's reaction time and focus may be lowered if the listener does not know that the speaker is extremely agitated or uses a tone that relays urgency and importance. Further, when a Delegate wishes to interrupt or question a currently-speaking Delegate, it is important that that speaking Delegate know this so that she can pause to allow the first Delegate to speak. But if she has to wait for one or more interpretations before hearing any indication of the desire to interrupt, the conversation is delayed. Thus, important time in the overall $\Delta T^{conv}$ can be saved by providing audio cues beyond just passing the interpreters' speech.

Figure 6:
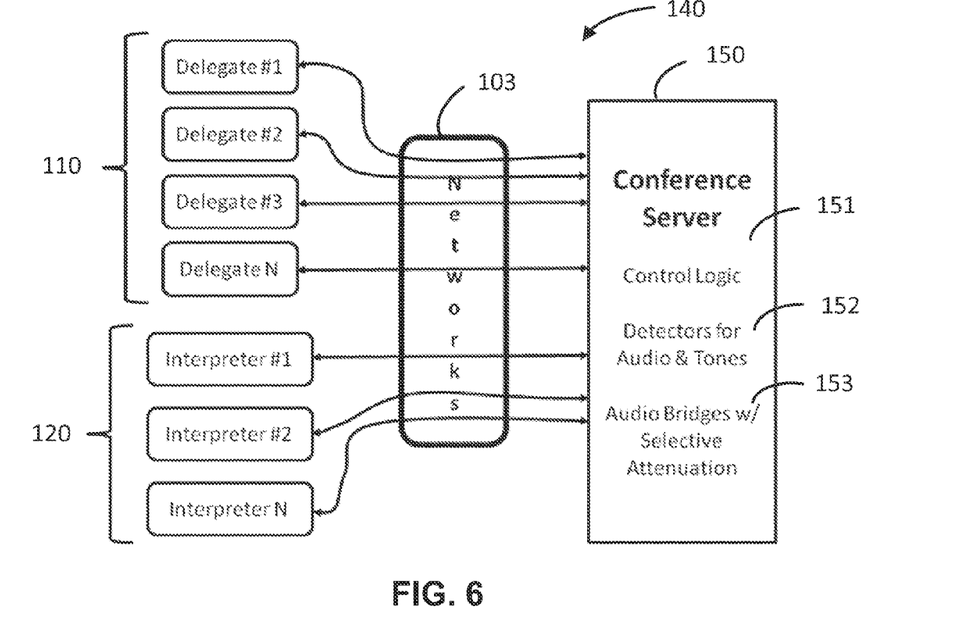
FIG. 6 is an illustration of the system illustrating the current multi-lingual conference bridge with cues according to an embodiment of the present disclosure.
Figure 7:
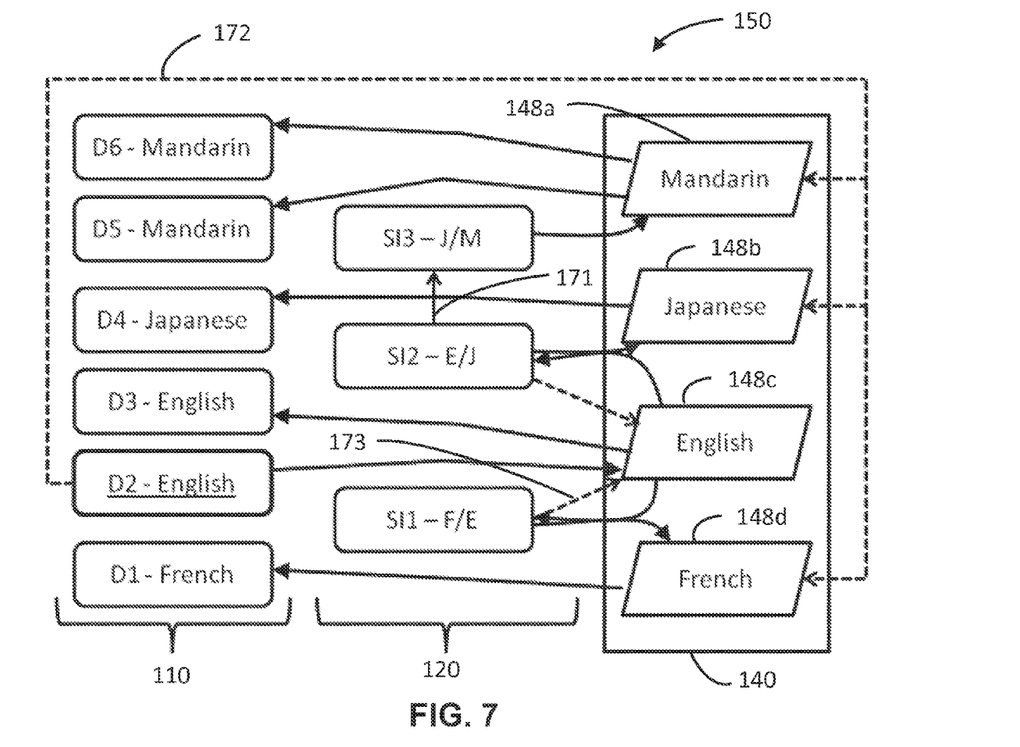
FIG. 7 is a diagrammatic representation of the fluxes of data and associated fluxes of cues generated or relayed by the multi-lingual conference bridge with cues of FIG. 5.

The new system as shown at FIGS. 5, 6 and 7 is a centralized system where each user is connected to that system by telephone or an Internet-based connection with audio, video, a combination thereof or any other data relay equipment. Each of the interpreters is assigned to (or select) a specific language that they will "listen from" and another that they will "interpret into."

First, if a person is connected to a specific bridge with a specific language (e.g., Russian) and the current speaker is also speaking Russian, the feed will be simply that of the original feed. In this case, an interpreter assigned to listen to a different language and interpret into the Russian bridge will be idle. As a different speaker initiates in a different language, and the "listen from" bridge of the idle interpreter is filled with sound, the Russian interpreter is now able to interpret the speech heard. Via a keyboard, a telephone keypad or any other input system, a user/delegate can select any bridge and change the bridge at any time. Thus, a delegate bilingual in French and Russian might start the meeting listening without interpretation. But when another delegate starts speaking Spanish, the first delegate could choose to listen in French, and take advantage of the Spanish-to-French SI.

SIs can change their language selection as well. This allows a single SI to play the role of, say, French-to-Spanish interpreter as well as Spanish-to-French interpreter. SIs can also elect to listen to another SI rather than to the delegates. This allows for "relay interpretation" described above where, for example, Russian is interpreted into Spanish by way of first being interpreted into French by one SI, and from there into Spanish by another SI.

The novel system is equipped to generate and manage the transfer to the different participants on the system with "audio cues" or "visual cues" or any other "cues." These cues, for example, allow a user/delegate to access information and data relating to either other participants or delegates, and information relating to any of the interpreters as to when they are speaking, or when they are stopping, to better manage the flow of the conversation. This is very important because, without audio, visual or other cues, participants depend only on audio feedback to know who is talking and when they can speak or interrupt.

Once cues are sent back to the different users of the system, what results is a dynamically flowing conversation where the multi-lingual "virtual meeting" experience mimics as closely as possible the physical meeting experience. Delegates and SIs can be located anywhere. Delegates can listen and speak in their preferred language. The conversation flows as it would for a physical meeting, without the slowdown and tedium of consecutive interpretations.

One more way to implement the prior art system shown at FIGS. 2 to 4 is to: (a) establish a separate conference call for each of the N languages needed for the call; as part of the system as shown, each of the separate conference calls is referred to, for example, as a "bridge"; (b) instruct the users of the system that are speakers of a first language to connect to a specific bridge, and the speakers of a second to an Nth language to connect to a second bridge, and so on for each of the N languages; (c) instruct an interpreter (simultaneous or consecutive) of two of the languages to connect to the two bridges that relate to the languages he/she can interpret; this may be done using two separate data transfer lines like two telephones and associated telephone lines; and (d) instruct other interpreters with the needed skills to connect until all bridges are connected as shown at FIG. 6. In one embodiment, the interpreters may wear two headsets with two microphones where one headset can cover the left ear and the other headset would cover the right ear and use his other connection.

Further, the method includes the step where (e) one of the interpreters is listening to a first language in his right ear, and interpreting into a second language into the second mouthpiece or other similar device. The interpreter would have to "mute" the right mouthpiece, because otherwise his words would be fed back to the bridge of the first language and interfere with those listening to that bridge. What results is a semi-automated system where an interpreter must use two different phones and lines. One of ordinary skill in the art will recognize that the instant invention offers significant benefits beyond the alternative primitive implementation.

While the above description is directed at a conference bridge relying mostly on audio data, and the current state of the technology in the field of multi-lingual conferencing strongly suggests the reliance of audio data, the inventor understands that the same technology can be extrapolated to the use of mostly non-audio data.

The same technology can be implemented on mostly video/audio platforms like Skype®. This interface allows the connection of audio and video feeds by multiple simultaneous users. Using existing technology, if one hundred participants desire to join the conference, they will call into a single bridge where it will be very difficult to manage the conference. To help group users in different language, users might set up physical locations (offices) where all of the Japanese speakers are invited to come so the main conference will have a limited number of actual users. Using the Frankel III technology, the LACS technology could be integrated with the Skype® conferencing capability, where multiple bridges are set up for the multi-lingual meeting and each user will be able to simply log into the bridge where only his/her language will be heard. Most of the time, when a user is talking in a different language, the voice of the interpreter will be heard. Using the Skype® analogy is only one of a large number of software platforms that can be used in addition to ordinary audio call systems to implement the invention of Frankel III and the current invention.

What is described and shown at FIGS. 5 to 7 is a system that is an important enhancement to all known multi-language conference systems, including, for example, the system described at FIGS. 2 to 4. The system described above eliminates the notion of separate conferences or bridges and replaces it with a holistic, language-aware system that delivers an efficient, seamless, flexible and reliable experience to users like delegates and interpreters alike, using a dynamic, flexible and individually customizable computer-controlled determination of the different data streams.

In this new method, the users, also known as delegates 110 and interpreters 120, connect to our "language-aware" conferencing system (LACS) 140, also shown to include a conference server 150. The LACS 140 associates each delegate, here delegate 1 to delegate N with a listening preference based on specific input from the delegate, or based on some other selection mechanism. The delegate could select the listening preference using an IVR system when first connecting, or he could dial some code on his telephone keypad (e.g., *41 for Spanish, *42 for Mandarin, or *40 for no interpretation).

In other embodiments, the listening preference is made based on a personal identification identifier associated with the country from which he was calling (Spanish if calling from Mexico, Spain, or Argentina), determined either by the number where he called from or the access number of the conference bridge dialed when a phone number is available in each of several different countries to connect to the system. Other features of the system are described and incorporated by reference from Frankel III.

The server 150 is a system that includes a control logic module 151, a cues detection module 152, also described as a detector for audio and/or other types of tones. The server 150 also may augment one or a plurality of audio bridges (shown at FIG. 7) with selective attenuation or other system such as an attenuation module 153 for providing cues within the different feeds in the system.

One novel element of the current invention is to provide audio cues in addition to the audio/video streams of information described above and in Frankel III to the users/delegates so that a party using the system is aware of the interpretation process and can sense when other delegates are speaking, the tone of the different actors using the system, the inflections, and the redundancy and importance of the stream under interpretation.

Of great importance is to note that during the process of simultaneous interpretation, as in any interpretation, there are natural delays and silences created by the interpreter as they find the right concepts and words to interpret. The cues transmitted alongside other normal interpretations will allow a user to recognize when the interpreter is silent for several seconds even though a delegate in the foreign language continues to speak. Similarly, in cases where the interpreters need a few seconds to finish interpreting after a delegate or user has stopped speaking, the use of cues will allow the listener to manage the response being prepared.

In one embodiment, one family of cues is the use of an attenuated level used as a background to be layered on top of the interpretation as a feed to a delegate and/or an interpreter. The use of a background lower level feed can in some cases not interfere with comprehension of the primary audio source, i.e., the interpretation that can be understood by the user/delegate.

The server 150 includes a system that generally is set up not to "echo" audio data back to its source. For example, if inputs from users A, B and C are being mixed by the server 150, the user A will not hear back a merged feed that includes its own audio but will only hear B plus C, B will hear A plus C, and C will hear A plus B or whatever is the case described below as managed by the control logic module 151.

As shown at FIG. 6, the bridges of FIG. 7 are capable of attenuating specific input signals to varying degrees as managed by the attenuation module 153. For example, in the above example where user A listens to user B and C, this communication C could be set for attenuation by a fixed level; in one embodiment the second channel attenuated and used as a cue is lowered by approximately 12 decibels. As described above, user A would hear user B at a normal volume and would hear user C softly in the background. A connection to a bridge can also be unidirectional, so that a party supplying input to a bridge does not hear the output from the bridge (or vice versa).

The module for the detection of audio and/or tones 152 is designed to be flexible and capable of adaptation based on the type of technology in which the system is adapted to be implemented. For example, in the case of a multi-lingual audio conference system, most of the data exchanged is in the form of voice and the detector module 152 is programmed for detection of different tones within the voice. For example, the detector module 152 detects silences, pauses, extreme verbal responses, certain key words, small electronic sounds, keyboard or numerical tones of a dial phone, names, or even when too many voices overlap and result in potential confusion. In the case of other, text based systems, the detector module 152 can recognize key words typed, written requests, or other data. The same logic of data modulation and detection can be applied to any system based on the technology.

FIG. 7 shows a system 150 where six delegates (D1 through D6) 110, and three interpreters (SI1 through SI3) 120 are connected to the conference server 140 using a system as shown at FIG. 5. Here, two of the delegates (D2, D3) speak English, two delegates speak Mandarin (D5, D6), one delegate (D1) speaks French, and finally one delegate (D4) speaks Japanese. Interpreter (SI1) speaks French and English, a second interpreter (SI2) English and Japanese, and a last and third interpreter (SI3) speaks Japanese and Mandarin. In FIG. 7, the conference server 140 is configured with four active bridges 148a, 148b, 148c and 148d, one for each language.

At FIG. 7, delegate D2, as shown by the underline, is the active participant and, for example, is speaking on his cell phone. The dark arrows show how the control logic module 151 of the conference server 150 relays the different voices. The dashed arrows also described as broken lines indicate how the selective attenuation module 153 using the detector module 152 will send and mix audio with attenuation to the different users and/or bridges.

In Frankel III, as shown at FIG. 2, the delegate D2 speaks into the English bridge 48c as shown by the arrow. Both SI1 and SI2, who understand English, hear the bridge 48b and interpret into bridges 48b and 48d, respectively. SI3 listens to bridge 48a and each of the delegates listens to their respective bridges 48a, 48b, 48c, and 48d.

FIG. 7 shows the different configuration of the current embodiment where each of the delegates are connected to listen to their respective bridges 148a, 148b, 148c and 148d but where the connection of the different interpreters SI1, SI2 and SI3 differs. In this example, SI3, instead of listening to the Japanese bridge 148b, is connected directly 171 to listen to the words spoken by the interpreter SI2. For example, SI3 does not need to hear D2 speak and is only focused on the interpretation of the information in Japanese, namely, the voice of SI2. While this is suggested as a best mode, what is contemplated is the use of any system without this direct link and with SI3 able to connect directly to 148b.

The voice of D2 is sent directly to the bridge 148c, and is then sent 172 via attenuation to the Mandarin, Japanese and French bridges 148a, 148b and 148d, respectively. The D2 voice is then heard in the background at a lower level by those listening to these bridges. This allows the other delegates (D1, D3, D4, D5 and D6) all connected to a bridge to know that D2 is still speaking even when their interpreters (SI1, SI2 or SI3 are momentarily silent). They will know instantly via the attenuated cue not to take their turns speaking until D2 is finished.

In a subsequent embodiment, the voices of the interpreters SI1 and SI2 interpreting from English into either Japanese or French (SI2 and SI1, respectively) are fed back quietly into the English bridge 173, 174. This allows the speaking delegate D2, and the non-speaking English delegate D3, to know that the interpretation is taking place. In cases where the delegate D4 has the floor, the series of bridges would be reconfigured accordingly.

In another embodiment, a control panel 180 as shown at FIG. 5 can be used to display the control logic module information 151 or any other type of information in a web browser operating in HTML or any other protocol and connected over the Internet or some other network to the LACS. This control panel can, for example, show the identity (name, telephone number, or other) of all of the participants in the meeting, and for each indicate what bridge 148a, 148b, 148c or 148d in the above example is being used. The control panel 180 can also show the status of interpretation of each SI and use other types of codes and cues to help identify the process, and even the presence and identity of the SIs.

In yet another embodiment, the system 140 supports more than one SI per language bridge 148a, 148b, 148c or 148c. Multiple SIs per bridge is used to help SIs with fatiguing simultaneous interpretation. The system allows for several SIs to be assigned to a single bridge, for example SI1 in FIG. 7 would in fact be two or more incoming calls either side-by-side at the same location or managed at two different locations. In the case of different locations, the control logic 151 as shown at FIG. 16 manages the interpreter 120 using some type of handoff from one to another, which can be by any number of means, for example analogous to those presented above for other functions. One SI for a bridge will be given an active status and will be able to talk into the interpreted bridge and the second SI may be on standby in a listen-only mode. The control of the control logic 151 can be made automatically, by a control panel 180 or by any other means either at the system 140 or by the SI itself (not shown).

As part of the control logic 151 shown at FIG. 6 and as described logically at FIG. 7, three different simultaneous interpreters can each be capable of interpretation between two languages. In one example all the SIs may share one common language but this is not a requirement of the invention (e.g., the SI3 capable of Japanese to Mandarin interpretation can be replaced with an English to Mandarin interpretation as long as SI3's input is bridge 148c and not 148b or SI2). In one embodiment, each interpreter understands at least two languages and is associated with (at least) two bridges.

The control logic 151 assigns interpreters starting with those speaking the same language as the delegate that has the floor, and then iterate assignments so that all delegates are served. For example, a meeting might include English-French (A), French-Dutch (B), Dutch-German (C) and German-Spanish (D) interpreters. When someone speaking Dutch has the floor, interpreters B and C are assigned to listen to the Dutch bridge, since they can both speak the language of the delegate that has the floor. Interpreter A listens to the French bridge, and interpreter D listens to the German bridge. Each interpreter speaks into his "other" bridge (that is, the bridge to which he is not listening). When a German-speaking delegate takes the floor, the connections are automatically reconfigured or they are configured according to inputs from the Interpreters. In this example, words of an English-speaking delegate conversing with a Spanish-speaking delegate would be interpreted four times before reaching the other party.

In another embodiment, each interpreter may understand three or more languages. Even more complex arrangements are possible. An interpreter might be tri-lingual, in which case he will be assigned listening and speaking bridges according to an algorithm that minimizes the number of sequential interpretations required while still ensuring that every delegate hears the interpreted audio. The interpreter may hear announcements telling him what language to interpret from and to. However, even with interpreters capable of operating between three or more languages, a meeting with delegates speaking N languages may require N−1 interpreters if all delegates are to hear (near) simultaneous interpretations (i.e., the tri-lingual interpreter can only interpret to a single language at a time).

In addition to the other digital uses described above, the system 140 can be used in conjunction with a physical meeting, in any of several ways. Each group of like-language speakers at the physical meeting can be treated as an additional delegate on the teleconference, and can be connected via appropriate "patches" between the in-house audio system and a telephonic or VoIP link. So, for example, the English speakers at the physical meeting would have their microphone and speaker connections merged and fed to the English bridge over one connection; likewise for the Spanish speakers, and so on. Alternatively, the delegates at the physical meeting can have individual connections to the system 140, or can share audio connections (amongst those speaking the same language) but have individual buttons or other means to request and relinquish the floor. The SIs can also be located at a physical meeting venue and "shared" with the system users, by means of independent audio connections between each SI and the system 140. Other audio options and optimizations are also possible.

SIs can be scheduled for work independent of the system 140, or the system can incorporate a database of SIs according to language ability and connection information. As part of the logic 151, the system 140 can connect the different needed SI automatically "on demand" according to the language selections made by delegates.

In yet another embodiment, users can be permitted to move between bridges (i.e., between different languages). For example, a Spanish-speaking delegate that also understands English might prefer to listen to a meeting in English so that he can hear the intonation and emotion in the English speaker's voice, and doesn't want to be subject to interpretation when someone is speaking in English. However, this delegate fluent in Spanish but conversant in English may be more comfortable speaking in his/her native language of Spanish into a Spanish bridge. These preferences can be handled automatically by the system 140, so, in our example, when our delegate had the floor (i.e., an arrow leads out of his box as shown at FIG. 7), the delegate would send voice to the Spanish language bridge. Such switching could alternatively be done manually by the delegate using an input means described earlier.

Similarly, the system 140 can include a bridge called or referred to as a floor bridge. Listeners in this bridge would hear whoever had the floor, in their native language. They would not get the benefit of interpretation. The floor bridge can be recorded to capture the original audio of all delegates and any attenuation or cue as desired. Other bridges can also be recorded to capture the results of interpretation.

Usually, in most conferences what is encouraged is where only one delegate has the floor at any given time, and all other delegates have the respect to remain silent. However, the system 140 can be made to allow for overlap of different speakers on the floor based on programming preferences. Delegates may be allowed to speak over each other or even over an SI, interrupting the current speaker at least to the point that the speaker knows he should yield when convenient so someone else can talk. In a corporate setting, the CEO of the corporation can be given floor preferences and allowed to enter and use the floor when desired.

The system 140 can capture an audio recording from a selected bridge or all bridges. The audio for a particular bridge, or for all bridges, may be transcribed using human transcriptions or automated speech recognition technology and/or displayed or given to users. The system 140 can be used together with web conferencing or can integrate web conferencing, so that delegates can view, for example, a slide presentation, documents or other graphics. If desired, the presentation could be tailored for each language.

Figure 8:
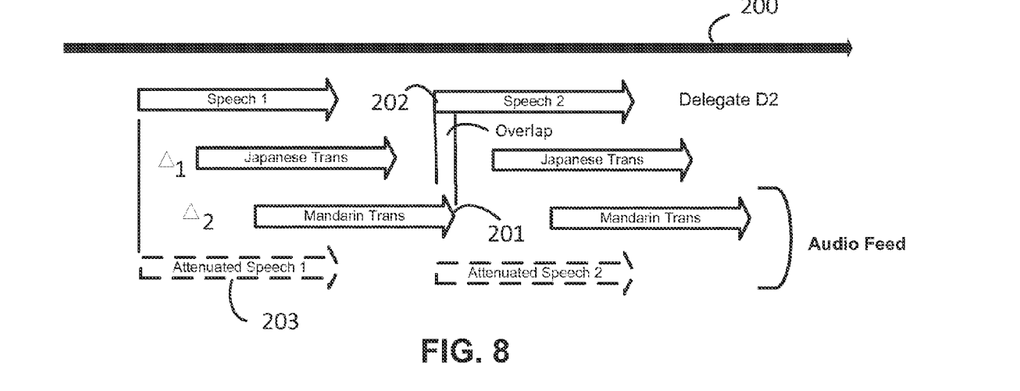
FIG. 8 is a diagrammatic representation of an original speech, several simultaneous interpretations and an attenuated cue according to an embodiment of the present disclosure.

FIG. 8 illustrates how the different flows of conversation can be improved using attenuated speech. Illustrated on a time bar 200 is how a conference with multiple interpretation evolves. Illustrated on this figure is a first delegate D2 speaking two different sentences illustrated by two arrows. Between both sentences, the delegate includes a gap in the speech but will resume several seconds later unless interrupted by one of the other delegates on the line. Illustrated by $\Delta 1$, the Japanese SI2 interprets simultaneously the two sentences. The Mandarin interpreter SI3 who is connected to SI2 will then also interpret the Japanese as fast as possible, creating a longer $\Delta 2$ delay. A person like D5 listening at FIG. 7 to the Mandarin bridge 148a may chime in the moment the interpretation ends. As shown by the diagram, the end of the first Mandarin sentence 201 may arrive later in time than the start of the second sentence 202 spoken by the delegate D2.

Illustrated by dotted arrows 203 is an attenuated voice used as a cue relayed into both the Japanese bridge 148b and the Mandarin bridge 148a as shown. The delegate D5 will hear the Mandarin interpretation but will, in the background, hear the start of the new D2 sentence. This cue is very helpful to guide the delegate D5 into coordinating his response. In this example, a gap exists between the first and the second sentence. The SI2 interpreting in Japanese as shown at FIG. 7.

Figure 9:
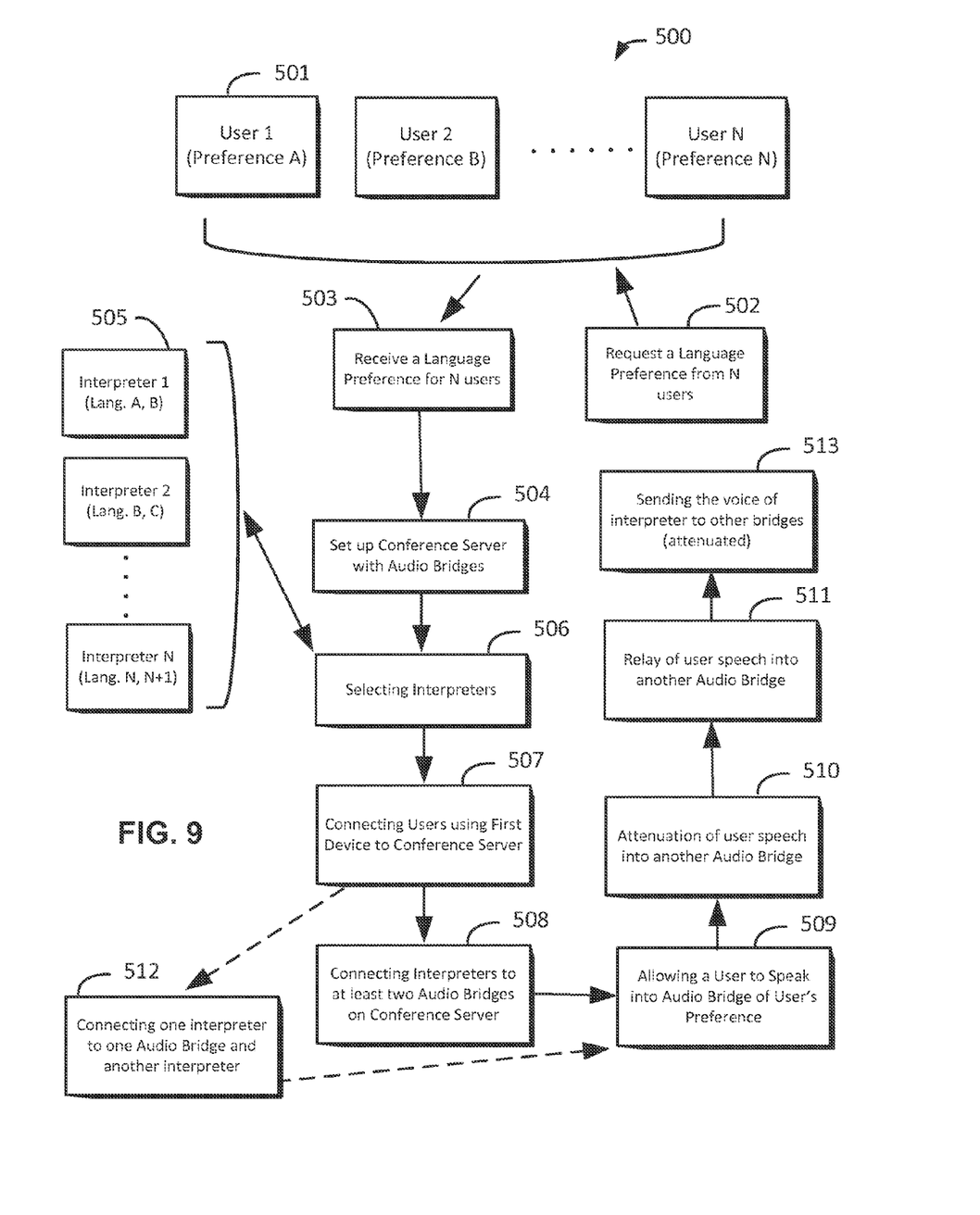
FIG. 9 is an illustration of the different steps associated with a method of holding a multi-language conference using a multi-protocol conference bridge.

FIG. 9 illustrates a method 500 of holding a multi-language conference using a multi-protocol conference bridge, the method 500 consisting of the steps of requesting 501 and receiving 503 from each of a plurality of users 501 a language preference for holding a conference, setting up 504 on a conference server a plurality of audio bridges as shown at FIG. 7 each for one of the language preferences of the plurality of users 501, selecting 506 a plurality of interpreters 505 each capable of understanding at least two of the languages of the audio bridges on the conference server, connecting 507 each of the plurality of users each using one of a plurality of first devices to the conference server on a server connected to a network by matching the language preference of each user with the language in each of the audio bridges, connecting each of the plurality of interpreters 508 to at least two of the audio bridges based on the languages understood by the interpreter, allowing 509 one of the users to speak into the connected audio bridge of the user's language preference, and relaying 511 by the conference server the speech of the user in the user's language preference into another of the audio bridges.

In further embodiments, the step of relaying the speech into another audio bridge is first attenuated 510 in audio level by the conference server, and also where one of the plurality of interpreters is connected 512 only to one of the audio bridges and to another of the plurality of interpreters based on the languages understood by the interpreter. Also the step of connecting each of the plurality of interpreters to at least two of the audio bridges based on the languages understood by the interpreter includes the step of allowing the interpreter to receive audio from a first audio bridge and send audio to a second audio bridge, or wherein the audio sent to the first audio bridge is attenuated 513 wherein the voice of the interpreter is sent to both the first and the second audio bridges.

As described above in great detail, what is disclosed is a teleconferencing system for simultaneous interpretation in a plurality of languages that includes an audio connection for each of a plurality of delegates, each delegate having a particular listening language, a two-way audio connection for each of one or more interpreters, each interpreter being identified as having a listening language and a speaking language, the two languages being different, a plurality of audio bridges for carrying out the following steps, each bridge capable of accepting inputs from one or more connections, mixing said inputs with specified levels of attenuation, and providing the resulting output to one or more connections without echoing the audio received from a particular connection back to that same connection.

The system also includes a means to configure the audio bridges such that each interpreter separately receives audio from all delegates, transmits audio to those delegates with a listening language matching the interpreter's spoken language for mixing without attenuation, and transmits audio to those delegates with a listening language matching the interpreter's listening language for mixing with attenuation, such that the voice of the interpreter is heard softly and delegate voice(s) dominate, a means for each delegate to transmit audio to all bridges, and a means to separately detect when each interpreter is speaking and, when said speech is detected, to cause any bridge receiving that interpreter's speaking language to attenuate audio inputs from delegates such that delegates are heard softly and the interpreter's voice dominates.

In alternate embodiments, the audio connections are made over one or more wide-area networks capable of connecting physically distinct locations, one of the interpreters can either change the listening and/or speaking language or change the listening language, one of the delegates can be identified as listening without interpretation, and will receive audio from all delegates without attenuation, an interpreter can be assigned to receive audio either directly from another interpreter or from two or more interpreters, the change in language is made using either keys on a telephone keypad or keys on a computer workstation, at least one audio connection is selected from a group consisting a conventional telephone network, and a voice-over-Internet protocol, and the attenuation of the level of the voice of an interpreter is adjustable, and a delegate is a group of individuals all with the same listening language.

Finally, what is also described above is a multi-protocol conference bridge system with a plurality of first devices where each of the first devices is used by one of a plurality of users for connection of each of the first devices over a network to a server, where each of the first devices includes a two-way connection for exchanging data between the users and the server in one of many protocols of communication, the protocol used being understood by the user, a plurality of a second device where each of the second devices is used by one of a plurality of interpreters for connection to the server, where the second device includes a two-way connection for exchanging data between each of the interpreters and the server in more than one protocol of communication.

In other embodiments, the protocols of communication are different languages, the bridges are audio bridges each in a different language, the users are conferences each in need of understanding the conference in their own preferred language, and each interpreter is capable of simultaneous interpretation between two languages, the cue is an attenuated audio communication in a first language sent into a bridge to overlap with a different language, the first and second devices are phones, the network is a wireless phone network, and wherein at least one of the second devices instead of being connected between two different bridges, is connected between a second interpreter and a bridge.

It is understood that the preceding is merely a detailed description of some examples and embodiments of the present invention and that numerous changes to the disclosed embodiments can be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A method of holding a multi-language conference using a teleconferencing system for simultaneous interpretation in a plurality of languages, comprising:
    an audio connection for each of a plurality of delegates, each delegate having a particular listening language;
    a two-way audio connection for each of one or more interpreters, each interpreter being identified as having a listening language and a speaking language, the two languages being different;
    a plurality of audio bridges for carrying out the following steps, each bridge capable of accepting inputs from one or more connections, mixing said inputs with specified levels of attenuation, and providing the resulting output to one or more connections without echoing the audio received from a particular connection back to that same connection;
    means to configure the audio bridges such that each interpreter separately: receives audio from all delegates; transmits audio to those delegates with a listening language matching the interpreter's spoken language for mixing without attenuation; and transmits audio to those delegates with a listening language matching the interpreter's listening language for mixing with attenuation, such that the voice of the interpreter is heard softly and delegate voice(s) dominate;
    means for each delegate to transmit audio to all bridges; and
    means to separately detect when each interpreter is speaking, and, when said speech is detected, to cause any bridge receiving that interpreter's speaking language to attenuate audio inputs from delegates such that delegates are heard softly and the interpreter's voice dominates, where the audio connections are made over one or more wide-area networks capable of connecting physically distinct locations, and
    wherein the method comprises the steps of:
    requesting and receiving from each of a plurality of delegates a language preference for holding a conference;
    setting up on a conference server the plurality of audio bridges each for one of the language preferences of the plurality of delegates;
    selecting a plurality of interpreters each capable of understanding at least two of the languages of the audio bridges on the teleconference system;
    connecting each of the plurality of delegates via the two-way connection to the teleconference system on a server connected to a network by matching the language preference of each delegate with the language in each of the audio bridges;
    connecting each of the plurality of interpreters to at least two of the audio bridges based on the languages understood by the interpreter;
    allowing one of the delegates to speak into the connected audio bridge of the delegate's language preference; and
    relaying by the teleconference system the speech of the delegate in the delegate's language preference into another of the audio bridges.

2. The method of claim 1, wherein the step of relaying the speech into another audio bridge is first attenuated in audio level by the teleconference system.

3. The method of claim 1, wherein one of the plurality of interpreters is connected only to one of the audio bridges and to another of the plurality of interpreters based on the languages understood by the interpreter.

4. The method of claim 1, wherein the step of connecting each of the plurality of interpreters to at least two of the audio bridges based on the languages understood by the interpreter includes the step of allowing the interpreter to receive audio from a first audio bridge and send audio to a second audio bridge.

5. The method of claim 4, wherein the voice of the interpreter is sent to both the first and the second audio bridges.

6. The method of claim 5, wherein the audio sent to the first audio bridge is attenuated.

* * * * *